Oct. 6, 1942.   F. H. GULLIKSEN   2,298,210
SEAM WELDING TIMER
Filed July 13, 1939   3 Sheets-Sheet 1

WITNESSES:
C. J. Weller.
Hymen Diamond.

INVENTOR
Finn H. Gulliksen.
BY
F. W. Lyle
ATTORNEY

Oct. 6, 1942.     F. H. GULLIKSEN     2,298,210
SEAM WELDING TIMER
Filed July 13, 1939     3 Sheets-Sheet 2

WITNESSES:
C. J. Weller.
Hyman Diamond

INVENTOR
Finn H. Gulliksen.
BY
F. W. Lyle
ATTORNEY

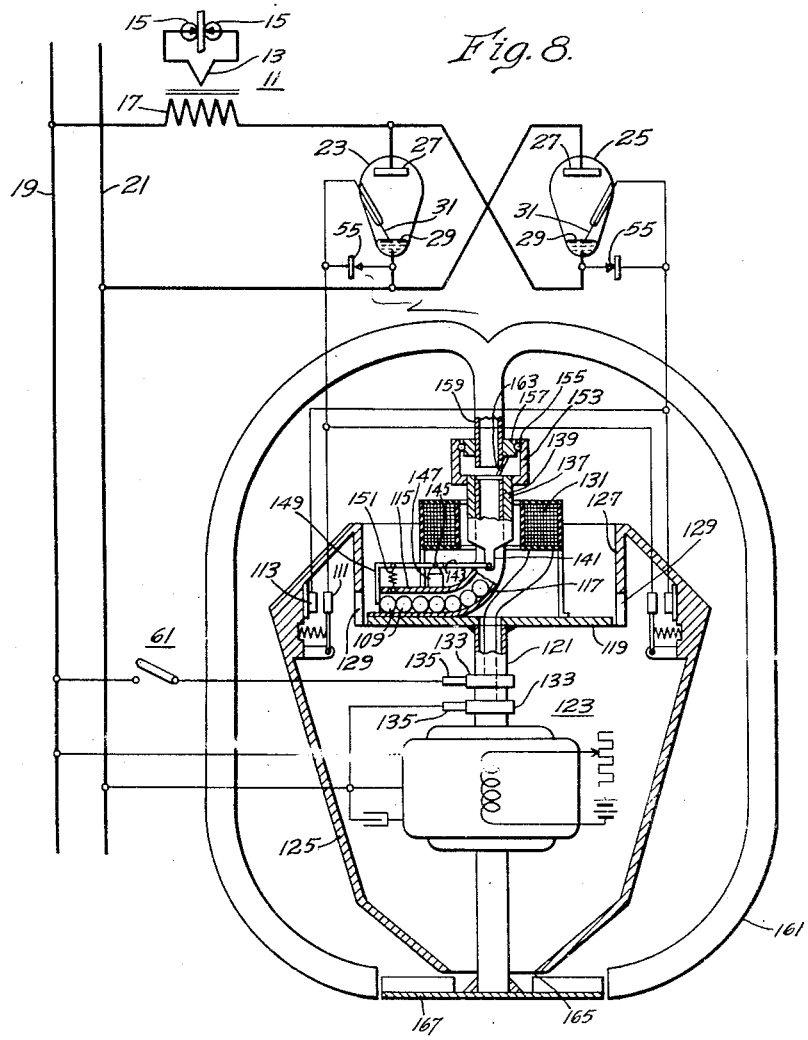
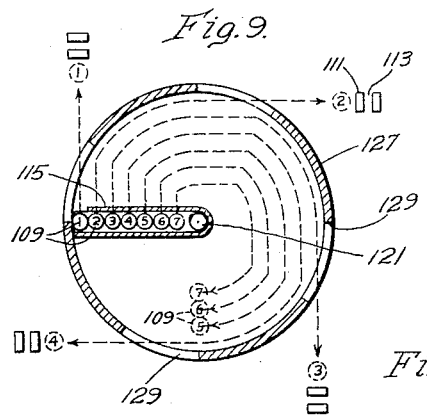

Patented Oct. 6, 1942

2,298,210

UNITED STATES PATENT OFFICE 2,298,210

SEAM WELDING TIMER

Finn H. Gulliksen, Pittsburgh, Pa., assignor to Westinghouse Electric & Manufacturing Company, East Pittsburgh, Pa., a corporation of Pennsylvania Application July 13, 1939, Serial No. 284,143

11 Claims. (Cl. 250—27)

My invention relates to electric discharge apparatus and has particular relation to welding apparatus in which electric discharge valves are used for controlling the current flow.

In the Vedder and Staggs application, Serial No. 214,160, filed June 16, 1938, Patent No. 2,165,911, dated July 11, 1939, and assigned to the assignee of the present application, and in the Slepian application, Serial No. 194,133, filed March 5, 1938, and assigned to the assignee of the present application, a control system particularly adapted for welding purposes is disclosed. In this arrangement, which I shall herein designate as a discharge contactor; a pair of discharge valves of the immersed-ignition electrode type are connected in anti-parallel between the source and the material to be welded. To control the current flow through the material, the ignition electrodes of the valves are interconnected for a predetermined interval of time.

When the discharge contactor is used for seam welding, the ignition is so timed that the valves are successively conductive and non-conductive for predetermined time intervals measured in half-periods of the source which supplies the welding current. The number of on-timing and off-timing half-periods which may be desirable depends on the composition and the physical structure of the material to be welded, and necessarily varies over a wide range. Accordingly, a difficult problem is involved in providing a suitable timing arrangement which has the necessary flexibility of adjustment. A synchronous switch operated by a variable cam has been suggested for this purpose, but on more thorough investigation the cost of a structure capable of covering the necessary range and accuracy of on-timing and off-timing half-periods has proved prohibitive.

Difficulty is, moreover, encountered in precisely controlling the flow of heat for welding purposes by presetting the instants in the half-periods of the source during which the valves are rendered conductive. As is explained in the Vedder and Staggs application, approximate heat control is attained in the ordinary circuit because of the delay in firing introduced by the ignition electrode. However, where greater precision is desired, reliance on this phenomenon alone does not lead to satisfactory results.

It is, accordingly, an object of my invention to provide a highly flexible seam welding arrangement of simple and inexpensive structure.

Another object of my invention is to provide a timer of simple and inexpensive structure with which it shall be possible to attain any desired on-timing and off-timing intervals for use with a discharge contactor.

A further object of my invention is to provide a timer with which it shall be possible to attain, by simple adjustment, any desired on-timing and off-timing intervals for use with a discharge contactor to control the current flow through a load that requires power in intermittent impulses.

An additional object of my invention is to provide a simple control arrangement for a discharge valve of the immersed ignition electrode type.

An ancillary object of my invention is to provide a system incorporating electric discharge valve means connected to conduct alternating current and controlled from a transformer in which the tendency of the transformer to become saturated by reason of the difference in the potential drop across the valve means during alternate half-periods shall be suppressed.

Still another object of my invention is to provide for a welding arrangement incorporating a discharge contactor, a circuit controller with which precise heat control shall be attainable.

A still further object of my invention is to provide for a discharge contactor to be supplied from a periodic source with a circuit controller to precisely determine the instants in the half-periods of a source of which the contactor is to be rendered conductive.

A specific object of my invention is to provide for a spot welding system a simple, tractable, and inexpensive timer that shall operate with precision.

More generally stated, it is an object of my invention to adapt the discharge contactor to fields of use in which the utmost precision in the presetting of the instant of ignition of the valves and in the timing of the current flow through the valves is indispensable.

In the application of my invention to seam welding the welding current is derived from an alternating source through a discharge contactor. The ignition electrodes of the contactor are interconnected through a high impedance sufficient to block the flow of ignition current during the off-timing half-periods. During each on-timing half-period a spark is produced and it functions to decrease the impedance to a value permitting the flow of ignition current.

The supply of heat for welding purposes may be predetermined by presetting the instants at which the sparks are produced. Specifically, the sparks are ignited between a fixed terminal and a plurality of moving terminals rotated by a synchronous motor in such manner that they successively approach the fixed electrode. By varying the phase of the position in space of the rotor of the motor relative to the half-waves of the source, the instants in the half-periods when the sparks are produced and the resultant supply of heat for welding purposes may be varied.

When the impedance in the ignition circuit of the discharge contactor includes a transformer, the difference in the arc drop across the valves during alternate on-timing half-periods may produce saturation. This condition is suppressed by interposing a capacitor in series with the primary of the transformer. The capacitor blocks the flow of any direct-current component.

Where heat control is desired in a spot welding system, a liquid-ray switch is provided in accordance with my invention. A liquid such as mercury is rotated in synchronism with the source, and liquid rays projected as a result of the centrifugal force establish the necessary connection between the ignition electrodes of the valves of the contactor. The supply of heat may be controlled by adjusting the position of the apertures through which the liquid rays are projected relative to the terminal with which they make contact.

In accordance with another aspect of my invention, a simple spot welding timer is provided by projecting missiles, such as steel balls used in bearings, in correspondence with the number of half-cycles of the source during which welding current is to flow. The missiles are arranged in a tube which is rotated by a motor in synchronism with the source and projected successively on circuit controlling elements by the centrifugal force resulting from the motion.

The novel features that I consider characteristic of my invention are set forth with particularity in the appended claims. The invention itself, however, both as to its organization and its method of operation together with additional objects and advantages thereof, will best be understood from the following description of specific embodiments when read in connection with the accompanying drawings, in which:

Fig. 8 is a view, partly diagrammatic and partly in section, showing a spot welder of simple structure in accordance with my invention; and Fig. 9 is a diagrammatic view illustrating the operation of the apparatus shown in Fig. 8.

Figure 1:
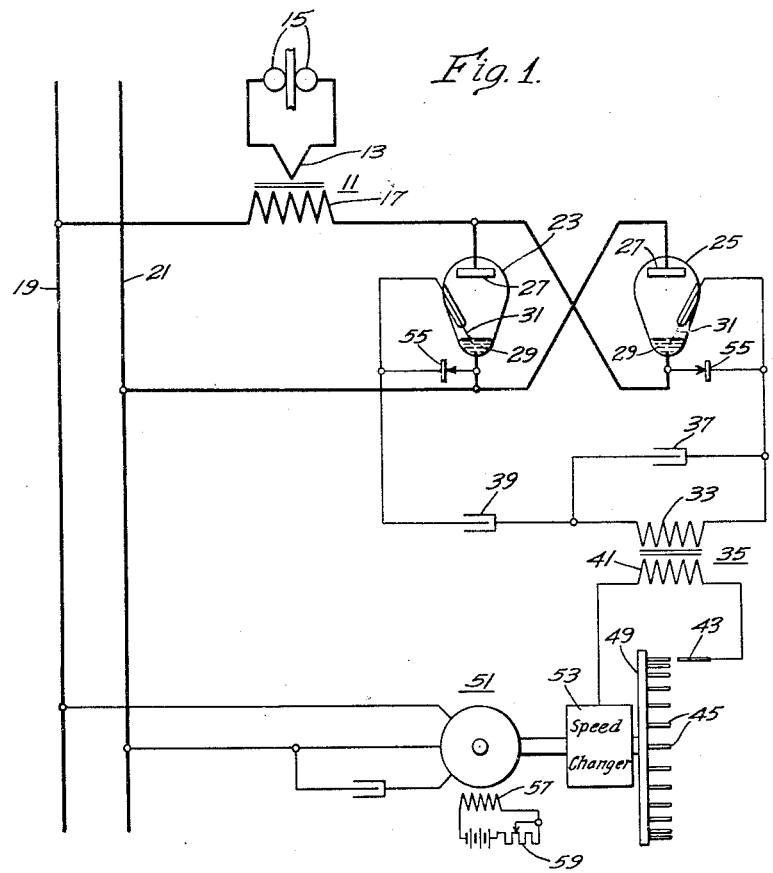
Figure 1 is a diagrammatic view showing a seam welder constructed in accordance with my invention.

The apparatus shown in Fig. 1 comprises a welding transformer 11 across the secondary 13 of which a pair of welding electrodes 15 are connected. The primary 17 of the transformer is supplied from alternating-current line conductors 19 and 21 through a pair of electric discharge valves 23 and 25 of the immersed ignition electrode type. The line conductors 19 and 21 may be energized from an alternating-current generator of any general type, and in the customary practice of my invention, are the usual commercial 60-cycle supply buses.

Each of the electric discharge valves 23 and 25 comprises an anode 27, a cathode 29 of the pool type, and an ignition electrode 31 in contact with the cathode. The ignition electrodes 31 of the valves are interconnected through a network consisting of the primary 33 of an auxiliary transformer 35 and a capacitor 37 connected in parallel therewith and through a series capacitor 39. The reactances of the transformer 35 and the parallel capacitor 37 are so selected that the parallel network is tuned to the frequency of the supply potential and, therefore, normally interpose a large impedance between the ignition electrodes 31.

The impedance is substantially decreased by sparks produced across the secondary 41 of the auxiliary transformer 35 which short-circuit the secondary. For this purpose, a fixed spark terminal 43 and a plurality of cooperative moving spark terminals 45 are provided. The moving terminals 45 are mounted in certain of the openings 47 of a disc 49 provided along its periphery with a series of equally spaced openings. The disc is rotated by a synchronous motor 51 energized from the line conductors 19 and 21 at a speed such that one opening passes the fixed terminal 43 during each half-period of the source. The openings 47 in which the movable terminals 45 are mounted, are selected to correspond to the half-periods during which welding current is to flow. The other openings correspond to the off-timing half-periods.

The fixed terminal 43 is preferably composed of a spark resisting material such as platinum-iridium or of any other substance available in the spark gap art. It is connected to one output tap of the secondary 41 of the auxiliary transformer 35. The other output tap of the secondary 41 is grounded by connection to the metallic speed changing device 53 from which the disc 49 is rotated. The movable terminals 45 are in metallic connection with the speed changer 53 and are, therefore, also grounded. The secondary potential of the auxiliary transformer 35 is thus impressed between the fixed spark terminal 43 and the movable terminals 45. The network 33—37 is connected across the line conductors 19 and 21 in a circuit extending from the left-hand line conductor 19, through the primary 17 of the welding transformer 11, the cathode 29 and the ignition electrode 31 of the right-hand valve 25, the network 33—37, the series capacitor 39, the ignition electrode and cathode of the left-hand valve 23 to the right-hand line conductor 21. Since the impedance of the network is large, the line potential is impressed across the primary 33 of the auxiliary transformer 35.

As the disc is rotated the movable terminals 45 successively pass adjacent to the fixed terminal 43 and as each in its turn approaches the fixed terminal, a spark is ignited and the secondary of the auxiliary transformer is short-circuited. Since the impedance of the network 33—37 and, therefore, the impedance between the ignition electrodes 31 is thus substantially decreased, current of large magnitude flows in the ignition circuit and depending on the polarity of the potential supplied by the conductors 19 and 21, one or the other of the valves 23 or 25 is rendered conductive. For example, assume that at the instant when one of the sparks occurs, the left-hand line conductor 19 has a positive polarity and the right-hand conductor 21 has a negative polarity. Under such circumstances current first flows in a circuit extending from the left-hand line conductor 19 through the primary 17 of the welding transformer 11, the cathode 29, and the ignition electrode 31 of the right-hand valve 25, the parallel tuned network 33—37 (now untuned), the series capacitor 39, the ignition electrode 31, and the cathode 29 of the left-hand valve 23 to the right-hand line conductor 21. At this time the anode 27 of the left-hand valve 23 is positive relative to its cathode 29, and, therefore, the valve is rendered conductive by the current flow through its ignition electrode. Welding current then flows through the valve 23 to energize the welding transformer 11. If a spark is ignited during the next half-period, the current flow through the ignition electrodes 31 is of the opposite polarity and the anode-cathode potential of the right-hand valve 25 is now positive. Under such circumstances, the current which now flows through the primary of the transformer is of the opposite polarity, and the load is supplied with a current impulse of the opposite polarity.

The current flow through the welding load is thus in half cycles corresponding to the ignition of the sparks. To select a predetermined number of on-timing and off-timing half-periods, movable spark terminals 45 are inserted in openings 47 in the disc 49 to correspond to the on-timing half-periods, and intermediate openings corresponding in number to the off-timing half-periods are left without terminals. Current then flows during the half-periods during which sparks are ignited between the terminals 43 and 45 and no current flows during the intermediate half-periods.

Since the ignition electrodes 31 of the valves 23 and 25 may be deleteriously affected by the inverse current flow through the valve for which the anode-cathode potential is at any time negative, it is desirable that the current flow of this polarity be as far as possible suppressed. For this purpose, rectifiers 55, preferably of the dry type, are interposed between each cathode 29 and its associated ignition electrode 31, in such a sense as to cut down the inverse current flow.

When either of the valves 23 or 25 is conductive its arc-drop potential is impressed across the primary 33 of the auxiliary transformer 35. For example, if the right-hand valve 25 is conductive, its arc-drop potential is impressed in a circuit which extends from its anode 27 through the cathode 29 and the ignition electrode 31 of the left-hand valve 23, the series capacitor 39, the primary 33 of the auxiliary transformer 35, and the ignition electrode 31 of the right-hand valve. The arc-drop potential impressed by one of the valves 23 or 24 is of opposite polarity to that impressed by the other valve. However, the valves cannot be matched so that their arc-drop is the same, and, therefore, the potential impressed from one valve is different from that impressed from the other valve, the difference being in practice at times as great as 5 volts. If the primary 33 of the auxiliary transformer 35 were connected directly in series with the ignition electrode 31 the transformer would soon become saturated because of this difference. However, the series capacitor 39 prevents the flow of a direct-current component through the primary of the auxiliary transformer and thus precludes saturation.

The valves 23 and 25 are rendered conductive substantially at the instants at which the secondary 41 of the auxiliary transformer 35 is short-circuited by the sparks. Therefore, the instant of the occurrence of the sparks determines the angle in the half-periods of the source at which the valves are rendered conductive. By shifting the phase position of the occurrence of the sparks relative to the half-waves of the source, the instants at which the valves are rendered conductive and the resultant supply of heat for welding may be varied. This object is accomplished in accordance with my invention by varying the angular position of the disc 49 relative to the half-waves of the source. The motor 51 is provided with a field winding 57 supplied with direct current, the magnitude of which is varied by means of a suitable rheostat 59 to attain the desired adjustment in the phase position.

Figure 4:
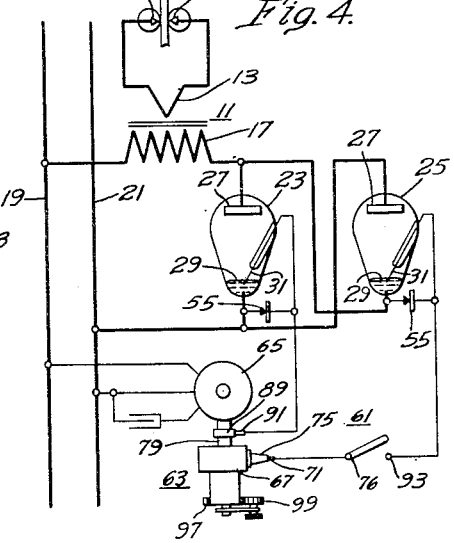
Fig. 4 is a diagrammatic view showing a modification of my invention in which the liquid ray switch is utilized in accordance with my invention.

In Fig. 4 a spot welding system in accordance with my invention is shown. The anodes 27 and the cathodes of the valves 23 and 25 are connected in circuit with the primary 17 of the welding transformer 11 in the same manner as in the Fig. 1 arrangement. The ignition electrodes 31 are, however, interconnected through a circuit controller 61, which may be a timing switch of any general type* and through a liquid-ray switch 63. The switch is rotated by a synchronous motor 65 and is used for controlling the heat supplied to the welding load.

Figures 2, 3:
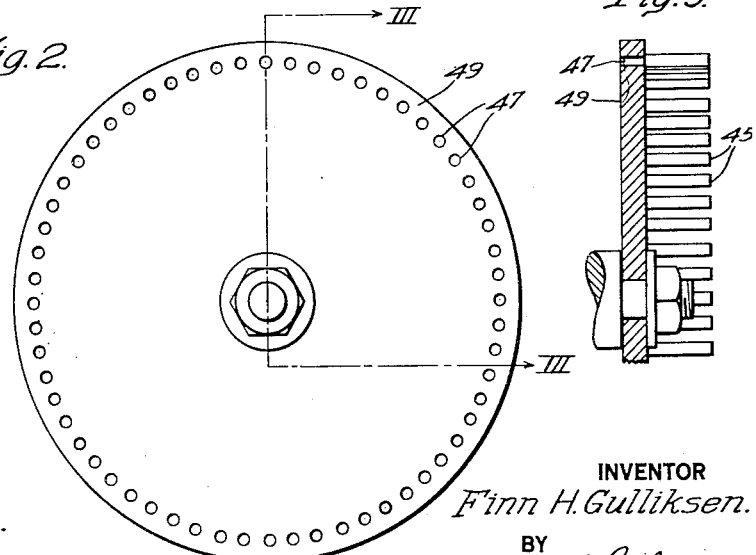
Fig. 2 is a view in plan showing a timing disc in accordance with my invention.
Fig. 3 is a view in section taken along the line III—III of Fig. 2.

*For example, tuning arrangements such as are shown in Figs. 1 and 2 of the Vedder and Staggs application may be used.

Figure 5:
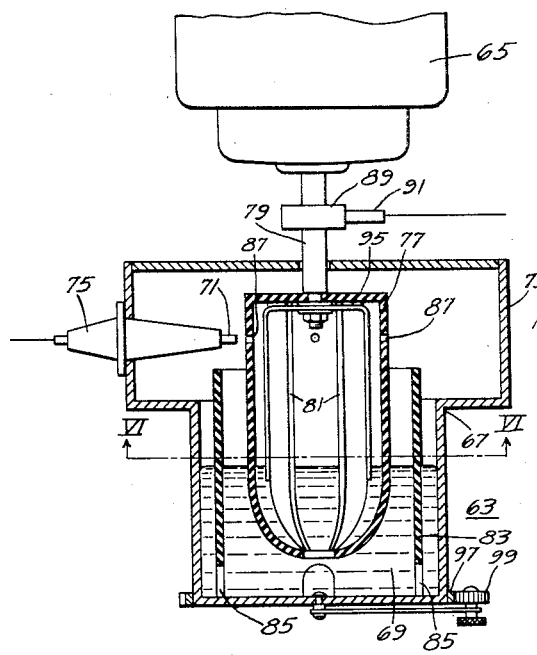
Fig. 5 is a view in transverse section showing a liquid-ray switch used in the practice of my invention.
Figure 6:
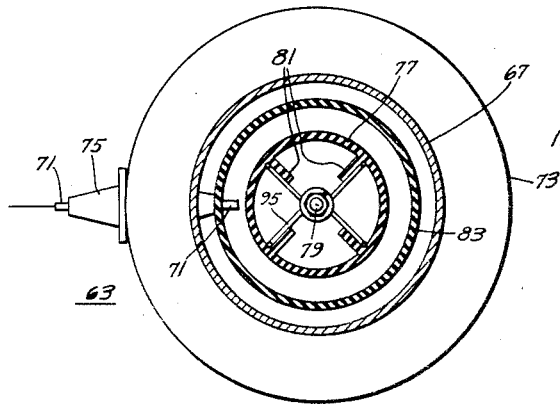
Fig. 6 is a view in section taken along the line VI—VI of Fig. 4.

The detailed structure of a liquid-ray switch 63 according to my invention is shown in Figs. 5 and 6. It comprises a cylindrical container 67 of cast iron or any other suitable metal in which a pool 69 of a conducting liquid such as mercury is disposed. The container 67 is flanged above the level of the pool 69 and a fixed electrode 71 projects horizontally through the wall of the extended volume 73 above the flange. The electrode 71 is provided with a sleeve 75 which insulates it from the container 67. The controller 61 is connected at one terminal to the electrode 71.

A chamber 77 in the form of a neckless bottle is suspended centrally in the container from the shaft 79 of the motor 65 and extends into the liquid 69. The head of the chamber 77 is open so that the liquid 69 is present therein at the same level as in the container 67. Within the chamber 77 a plurality of longitudinal fins 81 are provided. The fins extend into the liquid within the container and cause the liquid to move when the chamber is rotated. The chamber 77 may be composed of insulating material. It is, moreover, separated from the container 67 by an insulating tube 83 which extends well above the liquid level and is provided with openings 85 through which the liquid 69 on both sides of the tube are maintained in communication.

The diameter of the chamber 77 is such that the end of the fixed electrode 71 within the chamber is a short distance of the order of $\tfrac{1}{16}$ inch from its external wall. At the level of the electrode 71 openings 87 are provided in the chamber 77. The openings are uniformly spaced around the cross-section of the chamber, the angular displacement between them being preferably 90°. The motor is of the synchronous type and is designed to rotate at a speed of 1800 R. P. M. when supplied from a 60-cycle source. At this speed 7200 holes pass by the fixed electrode 71 per minute, that is, one hole passes by the electrode during each half-period of the source.

The shaft 79 of the motor 65 is provided with a conducting ring 89 which engages a suitable brush 91. The brush is connected to the ignition electrode 31 of the left-hand valve 23 and the remaining terminal 93 of the controller 61 is connected to the other ignition electrode 31. The fins 81 in the chamber 77 are composed of conducting material and are conductively connected to the shaft 79 through the spider 95 to which the shaft is secured. The liquid 69 is thus conductively connected to the ignition electrode 31 of the left-hand valve 23.

When the motor 65 is energized and the chamber 77 is rotated, the liquid 69 is also rotated and by reason of the centrifugal force, liquid rays are ejected through the openings 87 in the chamber. As the openings pass by the fixed electrode 71, the liquid rays impinge on the electrode and conductively connect the electrode 71 with the ignition electrode 31 of the left-hand valve 23. When the timing controller 61 is closed, the other ignition electrode 31 is thus connected to the first ignition electrode through the liquid rays and the ignition electrodes are connected across the line conductors 19 and 21 through the cathodes 29 of the valves. Ignition current, therefore, flows through the valves and they are alternately rendered conductive in the same manner as in the Fig. 1 arrangement.

The holes 87 pass the fixed electrode 71 at the rate of one during each half-period of the source and, therefore, the liquid rays establish the necessary contact for ignition at this rate. The instant at which the ignition circuit is established is dependent on the angular position of the electrode 71 relative to the openings 87. This may be set by adjusting the angular position of the cast iron container 67. The container 67 is provided with an external ring-gear 97 which is rotated by a fixed pinion 99. The pinion 99 may be used to preset the instant in a half-period of the source 19—21 when the circuit through the ignition electrodes 31 is closed and the valves 23 and 25 are rendered conductive and the heat control may thus be achieved.

Figure 7:
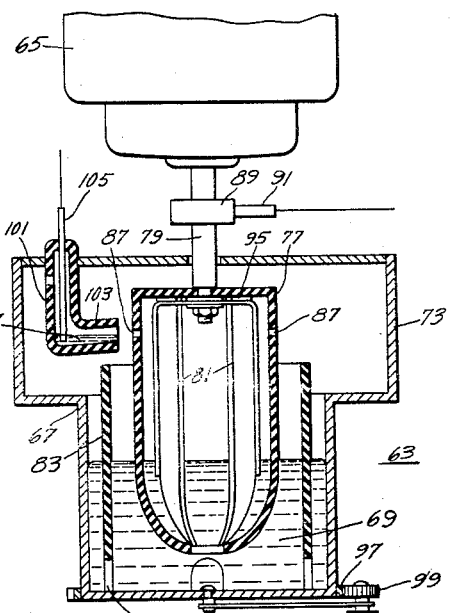
Fig. 7 is a view in transverse section showing a modification of the liquid-ray switch shown in Figs. 5 and 6.

The arrangement, according to Fig. 7, is similar to the Fig. 4 arrangement except that the fixed electrode comprises an insulating tube 101 with an elbow 103 which extends through the top of the container 67 and within which a conducting rod 105 is disposed. The rod is connected to the terminal 76 of the controller 61. The elbow 103 extends upward at a small angle to the horizontal and its opening is at the same level as the openings 87 in the chamber 77. The liquid rays are, therefore, projected into the elbow 103 and a small liquid pool 107 forms about the conducting rod 105. The connection between the rod and the brush is thus conveniently established through the pool 107.

In the apparatus shown in Figs. 8 and 9, missiles 109, such as balls as used in ball bearings or shot, are used to determine the number of half-cycles of current used in producing a spot weld. The missiles are projected by centrifugal force and impinge on the resilient movable contacts 111 of switches 113 closing the notches and interconnecting the ignition electrodes 31 of valves 23 and 25 connected in the same manner as in the arrangements shown in Figs. 1 and 4.

Initially the missiles are disposed in the horizontal arm 115 of right-angle tube 117. The tube is disposed on a circular table 119 mounted on the shaft 121 of a synchronous motor 123 and rotatable therewith. The motor 123 is disposed within a housing 125 of polygonal cross-section having a cylindrical reentrant portion 127 extending about the table 119. The reentrant cylinder 127 is provided with openings 129 around the lower portion of its periphery. The motor is preferably rotated from a 60-cycle alternating-current source at the rate of 1800 R. P. M. and the openings are displaced by an angle of 90° so that the horizontal arm 115 of the tube 117 passes by an opening 129 in the reentrant cylinder 127 once during each half-period of the source 19–21.

A relay coil 131 is centrally supported on the table 119. The coil is energized from the source 19–21 through rings 133 disposed on the shaft 121 of the motor 123 which engage cooperative brushes 135. One of the brushes 135 is directly connected to one line conductor 21 while the other brush is connected to the other line conductor through a timing controller 61 similar to the one used in the Fig. 4 system. The armature 137 associated with the coil 131 is of hollow cylindrical structure and is slidable about the vertical arm 139 of the right-angle tube 117. The armature 137 is tapered at the lower end and fingers 141 extend from the top of the tapered portion on opposite sides of the vertical arm 139 of the tube 117. The prongs 143 of a fork-shaped horizontal lever 145 pivotally engage the fingers 141. The lever 145 pivots about on a fixed fulcrum 147 at its center and its free end 149 is bent over at right angles. When the relay coil 119 is deenergized a spring 151 urges the free end downward so that it covers the opening in the horizontal arm 115 and holds the missiles 109 in the tube 117. At the upper end of the armature 137 a hollow flanged cylinder 153 is rigidly secured. The upper rim of the cylinder 153 engages a ball bearing wreath 155. The ball bearing ring 157 on which the wreath 155 is disposed slidably engages the outlet tube 159 of a missile dispenser 161 which opens into the vertical arm 139 of the right-angle tube 117. The ball bearing ring 157 engages a valve 163 which closes the opening in the outlet tube 159 when the ring slides downward with the cylinder 153 under the action of the relay coil 131 when it is energized.

Normally, the motor 123 is maintained energized and rotates the table 119 and the right-angle tube 117 with the missiles 109. However, the missiles are retained in the tube by the barrier 149 extending from the lever 145. When the timing controller 61 is closed, the relay coil 131 is energized and its armature 137 is pulled downward. The barrier 149 is then removed from the mouth of the right-angle tube 117 and at the same time, the valve 163 in the outlet tube 159 is closed. As the table now rotates, the missiles 109 are ejected one at a time from the openings 129 in the reentrant cylinder 127 and impinge on the corresponding movable contacts 111 of the switches 113 closing the latter, and causing ignition current to flow through the ignition electrodes 31. The valves 23 and 25 are, therefore, each in its turn, rendered conductive. Since the right-angle tube passes by an opening 129 in the cylinder 127 once during each half-period of the source 19—21, a missile 109 is ejected once during each half-period of the source and one or the other of the valves 23 and 25 is rendered conductive during a half-period for each missile. The number of half-periods during which the valves are conductive is determined by the number of missiles.

After rebounding from the movable contacts 111 of the switches 113, the missiles 109 drop through the open bottom 165 of the container 125 and are projected through guide tubes 167 and the dispenser 161 to the outlet tube 159 where they are held by the valve 163. After current has been supplied for the preset number of half-cycles, the timing controller 61 is opened. Under such circumstances, the relay coil 131 is deenergized and the valve 163 being opened, the missiles 109 drop into the horizontal arm 115 of the right-angle tube 117. Since the barrier 149 over the mouth of the tube is now again closed, the missiles remain there until another welding operation is initiated by closing the controller 61.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in supplying power from a source of periodically pulsating potential to a load the combination comprising electric discharge valve means having a pair of principal electrodes including a cathode of the pool type interposed between said source and said load, said valve means having an ignition electrode in contact with said cathode, connections including capacitive and inductive reactances forming a parallel tuned circuit between said source and said ignition electrode and said connections also including means for in effect short-circuiting said inductive reactance.

2. Apparatus according to claim 1 characterized by the fact that the inductive reactance is a transformer having primary and secondary windings and the short-circuiting means includes said secondary winding.

3. For use in supplying power from a source of periodically pulsating potential to a load the combination comprising electric discharge valve means having a pair of principal electrodes including a cathode of the pool type interposed between said source and said load, said valve means having an ignition electrode in contact with said cathode, connections including capacitive and inductive reactances forming a parallel tuned circuit between said source and said ignition electrode and said connections also including means for producing a spark in a gap across said inductive reactance, in effect short-circuiting said inductive reactance.

4. Apparatus according to claim 1 characterized by the fact that the inductive reactance is a transformer having primary and secondary windings and the short-circuiting means includes a spark gap across said secondary winding.

5. For use in supplying power from a source of periodically pulsating potential to a load the combination comprising electric discharge valve means having a pair of principal electrodes including a cathode of the pool type interposed between said source and said load, said valve means having an ignition electrode in contact with said cathode, connections including capacitive and inductive reactances forming a parallel tuned circuit between said source and said ignition electrode and said connections also including means for producing sparks during each one of a selected number of periods of said source, in effect, to short-circuit said inductive reactance during said periods.

6. For use in supplying power from a source of periodically pulsating potential to a load the combination comprising electric discharge valve means having a pair of principal electrodes including a cathode of the pool type interposed between said source and said load, said valve means having an ignition electrode in contact with said cathode, connections including capacitive and inductive reactances forming a parallel tuned circuit between said source and said ignition electrode and means operating in synchronism with said source for in effect short-circuiting said inductive reactance.

7. For use in supplying power from a source of alternating current to a load the combination comprising a pair of electric discharge valves each having an anode, a cathode of the pool type and an ignition electrode in contact with said cathode, means for connecting the anode of one of said valves directly to said source and the cathode of said one valve to said source through said load, means for connecting the cathode of said other valve directly to said source and the anode of said other valve to said source through said load, impedance means for interconnecting the ignition electrodes of said valves and spark gap means, connected to said impedance means, for in effect short-circuiting said impedance means.

8. Apparatus according to claim 7 characterized by the fact that the impedance means includes a transformer and the spark-gap means short-circuits the secondary of said transformer.

9. Apparatus according to claim 7 characterized by the fact that the impedance means includes a transformer having a primary and a secondary winding and the spark gap means comprises a fixed electrode connected to one side of said secondary winding, a member movable in synchronism with said source, and a selected number of electrodes connected to the other side of said secondary winding, said last-mentioned electrodes being mounted on said movable member in such a manner that one of them is disposed adjacent to said fixed electrode during each of a number of successive periods of the source corresponding to the selected number of said last-mentioned electrodes.

10. For use in supplying power from a source of alternating current to a load, the combination comprising a pair of electric discharge valves each having an anode, a cathode of the pool-type and an ignition electrode in contact with said cathode, means for connecting the anode of one of said valves directly to said source and the cathode of said one valve to said source through said load, means for connecting the cathode of the other valve directly to said source and the anode of said other valve to said source through said load, circuit means for rendering said pair of valves alternately conductive in successive half periods of said source including a transformer which is capable of becoming saturated, said transformer having a primary and a secondary with said primary being connected between said ignition electrodes, and a capacitor connected in series with said primary for preventing said transformer from becoming saturated by reason of the difference in the anode-cathode arc drop of said valves as they alternately conduct current.

11. For use in supplying power from a source of alternating current to a load, the combination comprising a pair of electric discharge valves each having an anode, a cathode of the pool-type and an ignition electrode in contact with said cathode, means for connecting the anode of one of said valves directly to said source and the cathode of said one valve to said source through said load, means for connecting the cathode of the other valve directly to said source and the anode of said other valve to said source through said load, circuit means for rendering said pair of valves alternately conductive in successive half periods of said source including a transformer which is capable of becoming saturated, said transformer having a primary and a secondary with said primary being connected between said ignition electrodes, and direct current blocking means connected in series with said primary for preventing said transformer from becoming saturated by reason of the difference in the anode-cathode arc drop of said valves as they alternately conduct current.

FINN H. GULLIKSEN.